United States Patent
Xu et al.

(10) Patent No.: US 11,588,200 B2
(45) Date of Patent: Feb. 21, 2023

(54) BATTERY MODULE (71) Applicant: CONTEMPORARY AMPEREX TECHNOLOGY CO., LIMITED, Ningde (CN)

(72) Inventors: Wencai Xu, Ningde (CN); Jun Liu, Ningde (CN); Jihua Yao, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 48 days.

(21) Appl. No.: 17/125,858

(22) Filed: Dec. 17, 2020

(65) Prior Publication Data

US 2021/0126315 A1  Apr. 29, 2021

Related U.S. Application Data (63) Continuation of application No. PCT/CN2020/106465, filed on Jul. 31, 2020.

(30) Foreign Application Priority Data

Aug. 15, 2019  (CN) .......................... 201921323599.7

(51) Int. Cl.
  *H01M 50/209*  (2021.01)
  *H01M 50/264*  (2021.01)
  (Continued)

(52) U.S. Cl.
  CPC ..... *H01M 50/209* (2021.01); *H01M 10/0468* (2013.01); *H01M 50/264* (2021.01); *H01M 50/296* (2021.01)

(58) Field of Classification Search
  CPC ............. H01M 10/04; H01M 10/0468; H01M 10/0481; H01M 50/20–209;
  (Continued)

(56) References Cited

U.S. PATENT DOCUMENTS 11,050,111 B2\* 6/2021 Liu ..................... H01M 50/271
2016/0181579 A1\* 6/2016 Geshi .................. H01M 50/502
429/61

(Continued)

FOREIGN PATENT DOCUMENTS

CN  206547229 U  10/2017
CN  206727133 U  12/2017
(Continued)

OTHER PUBLICATIONS

Contemporary Amperex Technology Co., Limited, International Search Report and Written Opinion, PCT/CN2020/106465, dated Nov. 3, 2020, 20 pgs.

(Continued)

*Primary Examiner* — Jonathan Crepeau
*Assistant Examiner* — Jacob Buchanan
(74) *Attorney, Agent, or Firm* — Morgan, Lewis & Bockius LLP (57) ABSTRACT

A battery module includes an output electrode base and an end plate, and the output electrode base is inserted into and fitted to the end plate. A first limiting element is disposed on the output electrode base, a limiting plate is disposed on the end plate, and the first limiting element is fitted to the limiting plate. A stop hole is provided in one of the output electrode base and the end plate, and a second limiting element is disposed on the other. The second limiting element is accommodated in the stop hole; and the second limiting element is fitted to the stop hole. The first limiting element is fitted to the limiting plate and the second limiting element is fitted to the stop hole to limit the relative movement of the output electrode base and the end plate.

13 Claims, 11 Drawing Sheets

(51) Int. Cl.
*H01M 10/04* (2006.01)
*H01M 50/296* (2021.01)

(58) Field of Classification Search
CPC ..... H01M 50/218–236; H01M 50/244; H01M 50/249–251; H01M 50/258–264; H01M 50/289–298; H01M 50/50–512; H01M 50/521–536
See application file for complete search history.

(56) References Cited

U.S. PATENT DOCUMENTS

| | | | |
|---|---|---|---|
| 2018/0062126 A1* | 3/2018 | Qin | H01M 50/216 |
| 2019/0207178 A1 | 7/2019 | Cao et al. | |
| 2020/0127253 A1 | 4/2020 | Liu et al. | |
| 2021/0305646 A1* | 9/2021 | Kubota | H01M 50/20 |
| 2022/0094012 A1* | 3/2022 | Liu | H01M 50/204 |

FOREIGN PATENT DOCUMENTS

| | | | | |
|---|---|---|---|---|
| CN | 207896173 U | 9/2018 | | |
| CN | 208819951 U | 5/2019 | | |
| CN | 209571451 U | 11/2019 | | |
| CN | 210403878 U | 4/2020 | | |
| EP | 3506388 A1 | 7/2019 | | |
| EP | 3641016 A1 | 4/2020 | | |
| WO | WO-2018061477 A1 * | 4/2018 | | H01M 2/10 |
| WO | WO2018/155093 A1 | 8/2018 | | |

OTHER PUBLICATIONS

Contemporary Amperex Technology Co., Limited, Extended European Search Report, EP20827983.6, dated Oct. 1, 2021, 3 pgs.

\* cited by examiner

BATTERY MODULE

CROSS REFERENCE TO RELATED APPLICATIONS

This application is a continuation application of PCT Patent Application No. PCT/CN2020/106465, entitled "BATTERY MODULE" filed on Jul. 31, 2020, which claims priority to Chinese Patent Application No. 201921323599.7, filed with the State Intellectual Property Office of the People's Republic of China on Aug. 15, 2019, and entitled "BATTERY MODULE", all of which are incorporated herein by reference in their entirety.

TECHNICAL FIELD

Embodiments of this application relate to the field of energy storage devices, and in particular, to a battery module.

BACKGROUND

A battery module usually includes an end plate and an output electrode base. The end plate is configured to compress a plurality of battery cells. The output electrode base is mounted on the end plate and is configured to secure an output electrode of the battery module.

However, after the output electrode base is mounted to the end plate, the output electrode base is prone to falling off during transport. Therefore, it is necessary to design a new battery module to prevent the output electrode base from falling off the end plate during transport.

SUMMARY

Embodiments of this application provide a battery module to solve a prior-art problem and prevent an output electrode base from falling off during transport, and an electric apparatus having the battery module.

An embodiment of this application provides a battery module, including an output electrode base and an end plate, wherein the output electrode base is inserted into and fitted to the end plate;

a first limiting element is disposed on the output electrode base, a limiting plate is disposed on the end plate, and the first limiting element is fitted to the limiting plate to limit relative movement of the output electrode base and the end plate along a first direction;

a stop hole is provided in one of the output electrode base and the end plate, and a second limiting element is disposed on the other; the second limiting element is accommodated in the stop hole; and the second limiting element is fitted to the stop hole to limit relative movement of the output electrode base and the end plate along a second direction; and an extension direction of the first direction is opposite to an extension direction of the second direction.

In some embodiments, the end plate includes a body;

the stop hole is provided in the body along a height direction of the battery module;

and the output electrode base includes a base plate, and the second limiting element protrudes from the base plate along the height direction of the battery module.

In some embodiments, a through groove is provided in the base plate;

a first end of the second limiting element is connected to an inner wall of the through groove; and there is a gap between parts, other than the first end, of the second limiting element and the inner wall of the through groove.

In some embodiments, the through groove includes an opening, and the opening is disposed away from the first end of the second limiting element.

In some embodiments, the second limiting element includes an elastic section;

the through groove is provided in the base plate;

a first end of the elastic section is connected to the inner wall of the through groove;

and a second end of the elastic section protrudes from the base plate.

In some embodiments, the second limiting element includes a fixed section and the elastic section;

a first end of the fixed section is connected to the inner wall of the through groove;

the first end of the elastic section is connected to a second end of the fixed section;

and the second end of the elastic section protrudes from the base plate.

In some embodiments, a thickness of the elastic section is less than a thickness of the fixed section.

In some embodiments, an angle θ between the elastic section and the fixed section meets: 90°<θ<180°.

In some embodiments, the angle θ between the elastic section and the fixed section meets: 135°<θ<170°.

In some embodiments, the battery module includes at least two second limiting elements; second ends of elastic sections of the at least two second limiting elements are mutually staggered along the second direction; and hole walls, fitted to the second limiting elements, of at least two stop holes are not coplanar.

According to the battery module described above, the first limiting element and the second limiting element are disposed on the output electrode base, and the limiting plate and the stop hole are disposed on the end plate. The first limiting element is fitted to the limiting plate to limit the relative movement of the output electrode base and the end plate along the first direction, and the second limiting element is fitted to the stop hole to limit the relative movement of the output electrode base and the end plate along the second direction, thereby improving connection reliability of the output electrode base during transport.

In addition, the second limiting element is accommodated in the stop hole. During installation of the output electrode base, the output electrode base is inserted into a slot without interference and further inserted until the first limiting element is fitted to the limiting plate, thereby facilitating an assembly process of the output electrode base. Furthermore, no interfering object is disposed on a side of the end plate facing away from the limiting plate, and installation space of a battery cell near the end plate is neither occupied, thereby improving energy density of the battery module.

Another embodiment of this application provides an electric apparatus including the aforementioned battery module.

It should be understood that the foregoing general descriptions and the following detailed descriptions are merely examples, and do not constitute any limitation on this application.

BRIEF DESCRIPTION OF DRAWINGS

To describe the technical solutions in the specific implementation manners of this application or in the prior art more clearly, the following briefly describes the accompanying drawings required for describing the specific implementation manners or the prior art. Apparently, the accompanying drawings in the following description show merely some implementation manners of this application, and a person of ordinary skill in the art may still derive other drawings from these accompanying drawings without creative efforts.

REFERENCE NUMERALS

100. battery module;
1. output electrode base;
11. base plate;
111. through groove;
111*a*. opening;
12. second limiting element;
12*a*. first end;
121. elastic section;
121*a*. first end;
121*b*. second end;
122. fixed section;
122*a*. first end;
122*b*. second end;
13. insertion element;
14. first limiting element;
2. end plate;
21. body;
22. stop hole;
221. hole wall;
23. slot;
24. limiting plate.

The accompanying drawings herein are incorporated in the specification as a part of the specification, showing embodiments that are in accordance with this application, and used together with the specification to explain a principle of this application.

DESCRIPTION OF EMBODIMENTS

The following clearly describes the technical solutions in this application with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The singular forms preceded by "a/an", "the" and "this" used in the embodiments of this application and the appended claims are also intended to include their plural forms, unless otherwise specified expressly in the context.

It should be understood that the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be noted that the directional terms such as "up", "down", "left", and "right" described in the embodiments of this application are described as seen from the angles shown in the accompanying drawings, and should not be understood as a limitation on the embodiments of this application. In addition, in the context, it should be further understood that when an element is referred to as being "above" or "under" another element, the element can either be directly connected "above" or "under" the another element, or be indirectly connected "above" or "under" the another element through an intermediate element.

Figure 1:
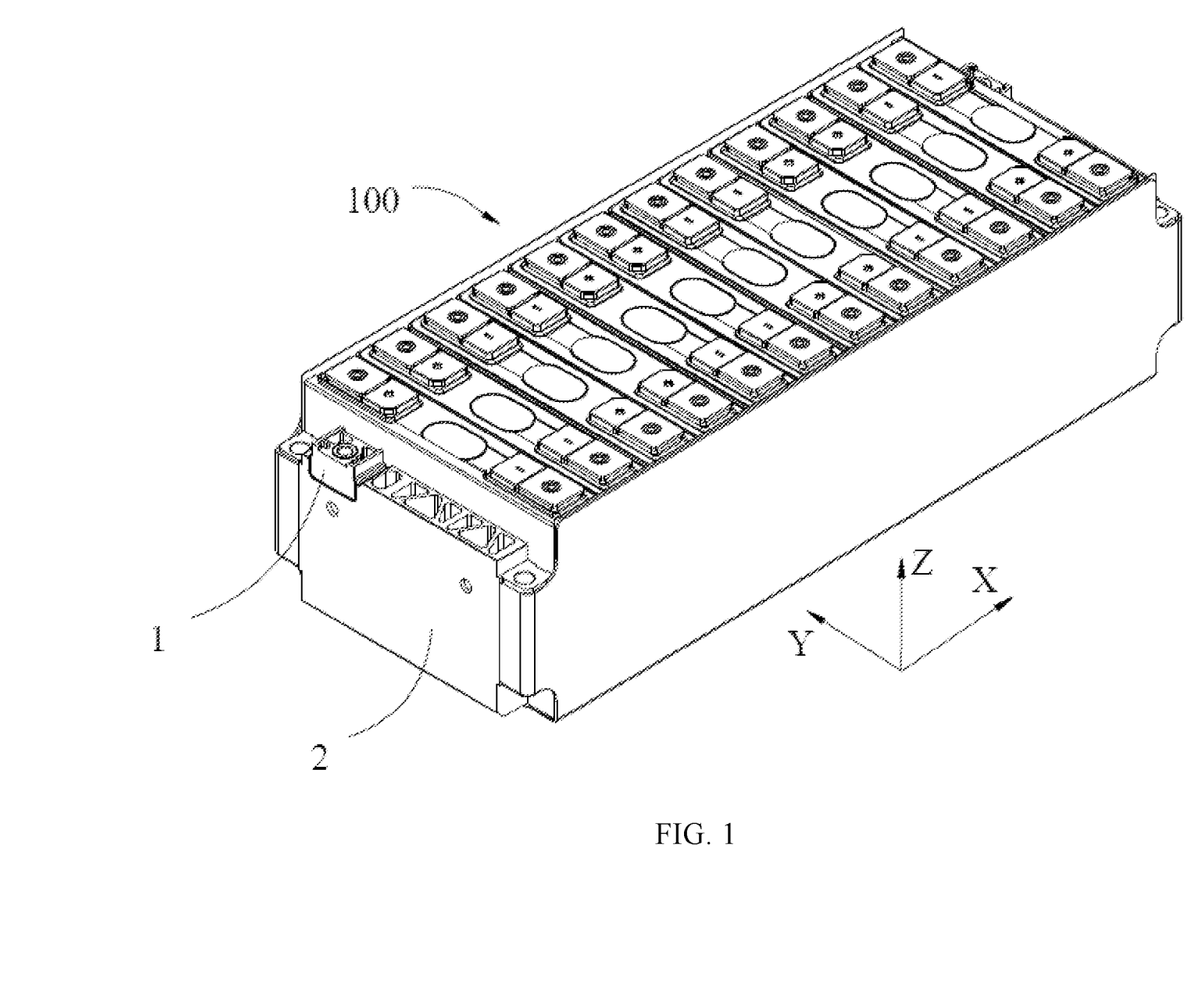
FIG. 1 is a schematic structural diagram of a battery module according to an embodiment of this application.
Figure 2:
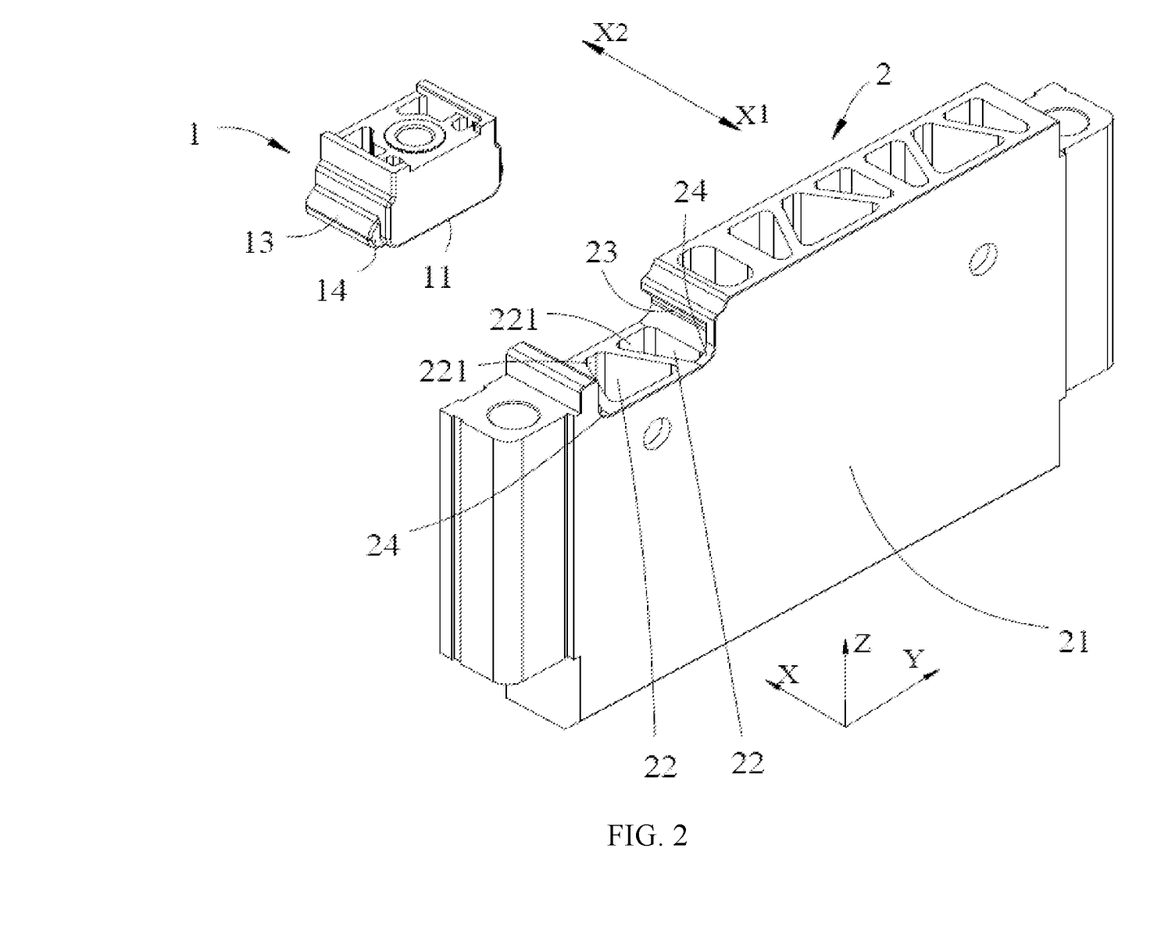
FIG. 2 is a schematic exploded view of fitting of an output electrode base to an end plate in a battery module according to an embodiment of this application.
Figure 3:
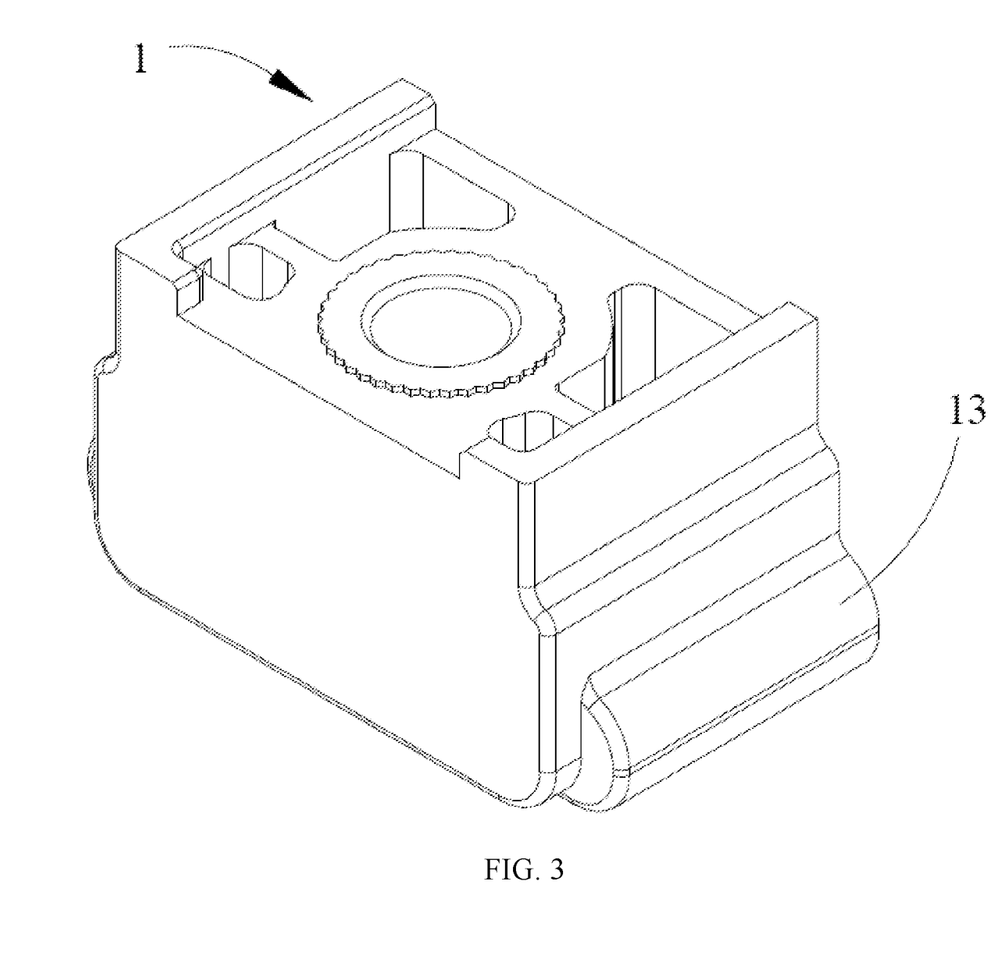
FIG. 3 is a schematic structural diagram of an angle of an output electrode base in a battery module according to an embodiment of this application.
Figure 4:
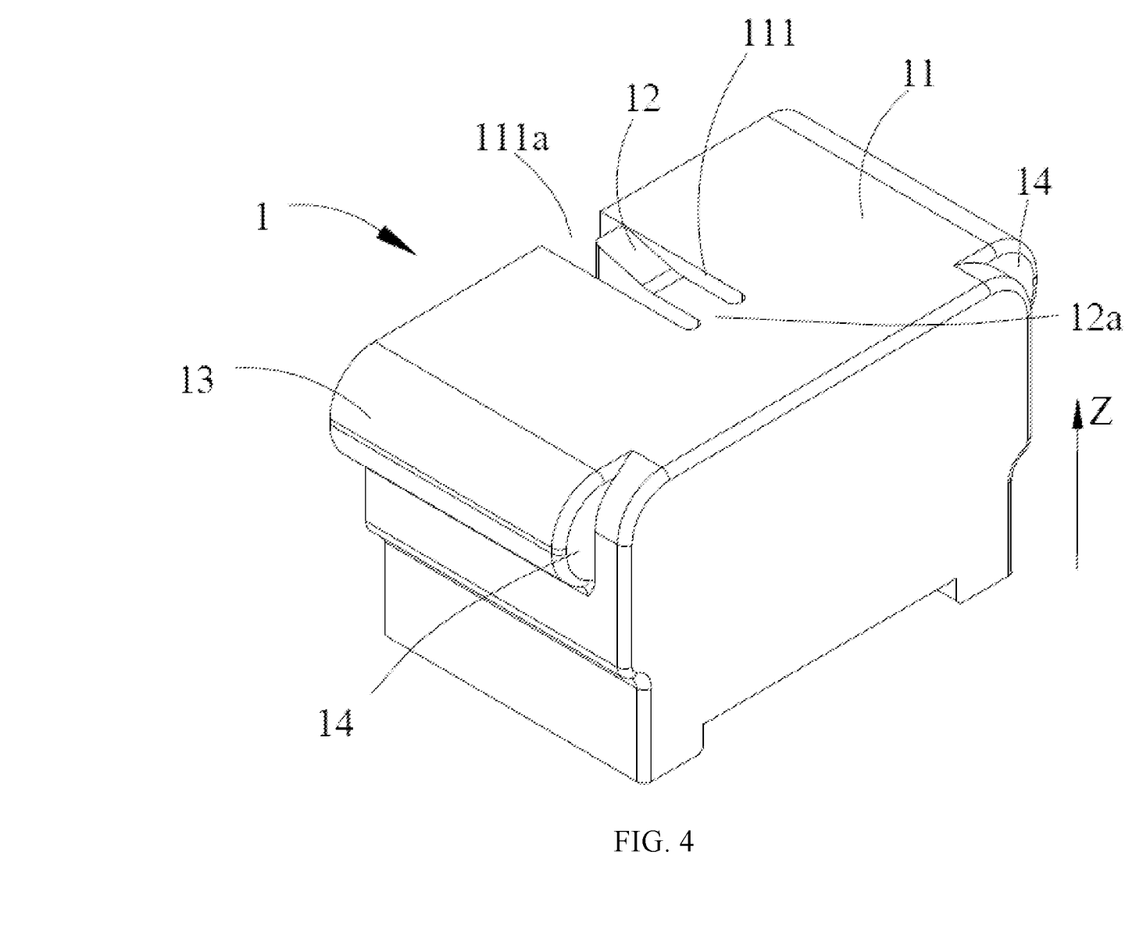
FIG. 4 is a schematic structural diagram of another angle of an output electrode base in a battery module according to an embodiment of this application.

FIG. 1 is a schematic structural diagram of a battery module according to an embodiment of this application. FIG. 2 is a schematic exploded view of fitting of an output electrode base to an end plate in a battery module according to an embodiment of this application. FIG. 3 is a schematic structural diagram of an angle of an output electrode base in a battery module according to an embodiment of this application. FIG. 4 is a schematic structural diagram of another angle of an output electrode base in a battery module according to an embodiment of this application.

As shown in FIG. 1 and FIG. 2, an embodiment of this application provides a battery module 100, including an output electrode base 1 and an end plate 2. The end plate 2 may be made of a metal material. The output electrode base 1 is configured to provide insulation protection for an output electrode of the battery module 100, and may be made of a plastic material.

The output electrode base 1 is inserted into and fitted to the end plate 2. In this embodiment, the output electrode base 1 may be inserted into the end plate 2 in a length direction (X) of the battery module 100. In another embodiment, the output electrode base 1 may alternatively be inserted into and fitted to the end plate 2 in another direction of the battery module 100.

In a possible implementation, an insertion element 13 is disposed on the output electrode base 1 and a slot 23 is provided in the end plate 2. In this embodiment, the slot 23 extends along the length direction (X) of the battery module 100, the insertion element 13 also extends along the length direction (X) of the battery module 100, and the insertion element 13 is inserted into the slot 23. The slot 23 may be in an approximate swallow-tail shape, and the insertion element 13 may also have an outline of an approximate swallow-tail shape, so as to limit relative movement of the output electrode base 1 on the end plate 2 along a height direction (Z) and a width direction (Y) of the battery module 100.

A first limiting element 14 is disposed on the output electrode base 1. The first limiting element 14 may be an end surface formed at one end of the insertion element 13, or may be a projection or another structure fixed on the insertion element 13 or fixed on another position of the output electrode base 1. In this embodiment, the first limiting element 14 is an end surface formed at one end of the insertion element 13.

A limiting plate 24 is disposed on the end plate 2, and the limiting plate 24 may extend upward along the height direction (Z) of the battery module to form a barrier to the first limiting element 14. The first limiting element 14 is fitted to the limiting plate 24 to limit relative movement of the output electrode base 1 and the end plate 2 along a first direction (X1). In this way, after the output electrode base 1 is mounted to the end plate 2, the output electrode base 1 does not fall off along the first direction (X1) when the end plate 2 and the output electrode base 1 are tilted or overturned during transport of the output electrode base 1 and the end plate 2.

As shown in FIG. 2 and FIG. 4, a stop hole 22 is provided in one of the output electrode base 1 and the end plate 2, and a second limiting element 12 is disposed on the other. The second limiting element 12 is accommodated in the stop hole 22. In this embodiment, the second limiting element 12 is disposed on the output electrode base 1, and the stop hole 22 is provided in the end plate 2. The second limiting element 12 is fitted to the stop hole 22 to limit the relative movement of the output electrode base 1 and the end plate 2 along a second direction (X2). An extension direction of the first direction (X1) is opposite to an extension direction of the second direction (X2). In this embodiment, the first direction (X1) and the second direction (X2) are two opposite directions in the length direction (X) of the battery module 100.

According to the battery module 100 provided in this embodiment of this application, the second limiting element 12 is disposed on the output electrode base 1, the stop hole 22 is provided in the end plate 2, and the second limiting element 12 is accommodated in the stop hole 22. During installation of the output electrode base 1, the output electrode base is inserted into a slot 23 without interference and further inserted until the first limiting element 14 is fitted to the limiting plate 24, thereby facilitating an assembly process of the output electrode base. Furthermore, no interfering object is disposed on a side of the end plate 2 facing away from the limiting plate 24, and installation space of a battery cell near the end plate 2 is neither occupied, thereby improving energy density of the battery module 100.

During transport of the output electrode base 1 and the end plate 2, if the output electrode base 1 and the end plate 2 are tilted or overturned along the first direction (X1), the output electrode base 1 does not fall off because the first limiting element 14 is fitted to the limiting plate 24. If the output electrode base 1 and the end plate 2 are tilted or overturned along the second direction (X2), the output electrode base 1 neither falls off because the second limiting element 12 is fitted to the stop hole 22, thereby improving connection reliability between the output electrode base 1 and the end plate 2 during transport.

In a possible implementation, as shown in FIG. 2 and FIG. 4, the end plate 2 includes a body 21, and the stop hole 22 is provided in the body 21 along the height direction (Z) of the battery module 100. The output electrode base 1 includes a base plate 11, and the second limiting element 12 protrudes from the base plate 11 along the height direction (Z) of the battery module 100.

The insertion element 13 of the output electrode base 1 is inserted into the slot 23 of the end plate 2. Before transport, the second limiting element 12 is accommodated in the stop hole 22. The second limiting element 12 may not be in contact with a hole wall 221 of the stop hole 22, or the second limiting element 12 comes in contact with the hole wall 221, but the two do not press against and interfere with each other. During transport, if the output electrode base 1 and the end plate 2 are tilted or overturned along the second direction (X2), the second limiting element 12 may press against and interfere with the hole wall 221 of the stop hole 22 to prevent the output electrode base 1 from falling off.

The second limiting element 12 is disposed on the base plate 11 of the output electrode base 1, and an existing hole in the body 21 of the end plate 2 is used as the stop hole 22. Therefore, occupied space can be reduced, and the energy density of the battery module 100 can be improved.

In a possible implementation, a through groove 111 is provided in the base plate 11. As shown in FIG. 4, a first end 12a of the second limiting element 12 is connected to an inner wall of the through groove 111, and there is a gap between parts, other than the first end 12a, of the second limiting element 12 and the inner wall of the through groove 111.

The through groove 111 is formed during processing of the second limiting element 12. The gap provided in the through groove 111 also makes the second limiting element 12 elastic to some extent. During insertion of the insertion element 13 of the output electrode base 1 into the slot 24 of the end plate 2, the second limiting element 12 is elastically deformed to enter the stop hole 22.

In a possible implementation, the through groove 111 includes an opening 111a, and the opening 111a is disposed away from the first end 12a of the second limiting element 12. The through groove 111 with the opening 111a can be obtained by means of a simple cutting process, and therefore the second limiting element 12 can be obtained by means of a relatively simple cutting process. In addition, disposition of the opening 111a also makes the output electrode base 1 lighter and further improves the energy density of the battery module 100.

The following describes another example embodiment. However, detailed description of constituent components the same as those in the foregoing example embodiment is omitted, and only different constituent components are described in detail.

Figure 5:
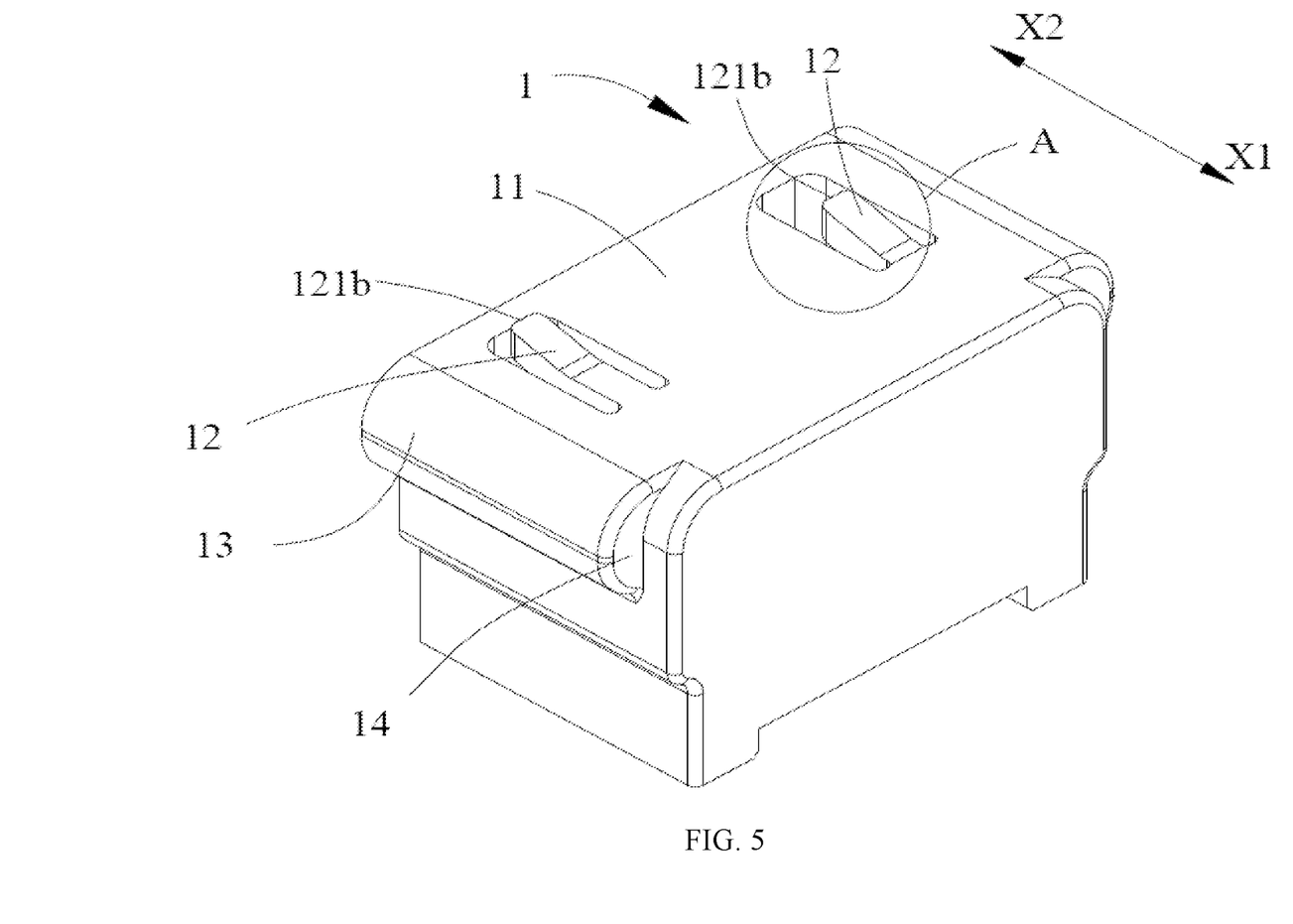
FIG. 5 is a schematic structural diagram of another output electrode base in a battery module according to an embodiment of this application.
Figure 6:
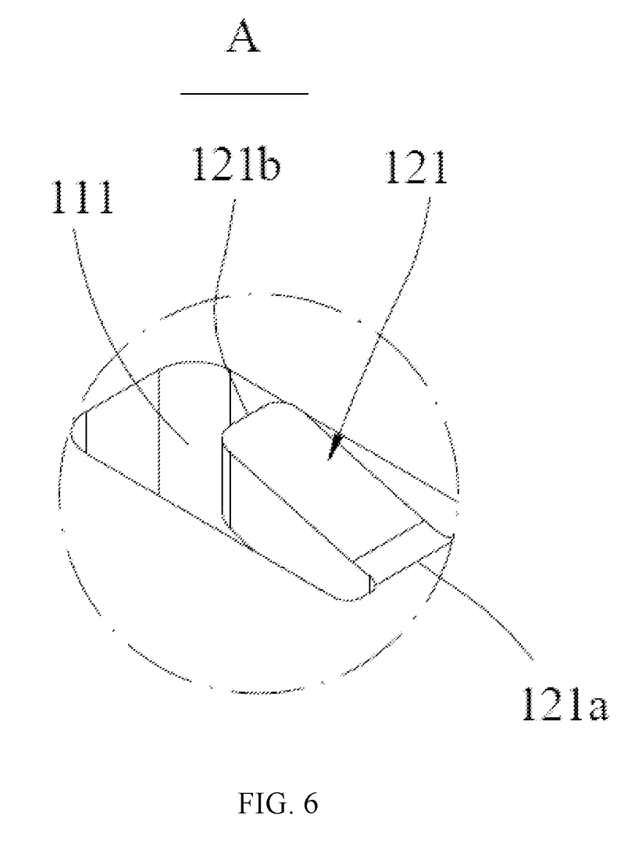
FIG. 6 is an enlarged view of position A in FIG. 5.

FIG. 5 is a schematic structural diagram of another output electrode base in a battery module according to an embodiment of this application, and FIG. 6 is an enlarged view of position A in FIG. 5.

In a possible implementation, as shown in FIG. 5 and FIG. 6, a second limiting element 12 includes an elastic section 121. A through groove 111 is provided in a base plate 11, a first end 121a of the elastic section 121 is connected to an inner wall of the through groove 111, and a second end 121b of the elastic section 121 protrudes from the base plate 11.

Optionally, there is a gap between parts, other than the first end 121a, of the elastic section 121 and the inner wall of the through groove 111, thereby improving elasticity of the elastic section 121.

It can be understood that the elastic section 121 may be an elastomer directly formed on the base plate 11, or the elastic section 121 may be a block-like structure and a corresponding notch is provided in the elastic section 121 to make the elastic section 121 elastic to some extent.

In a structure of the second limiting element 12, a raised tilt section is formed by the elastic section 121. During insertion of an insertion element 13 into a slot 23, a bevel structure of the raised tilt section can play a guiding role, so that the second limiting element 12 enters a stop hole 22 of the end plate 2.

The following describes another example embodiment. However, detailed description of constituent components the same as those in the foregoing example embodiment is omitted, and only different constituent components are described in detail.

Figure 7:
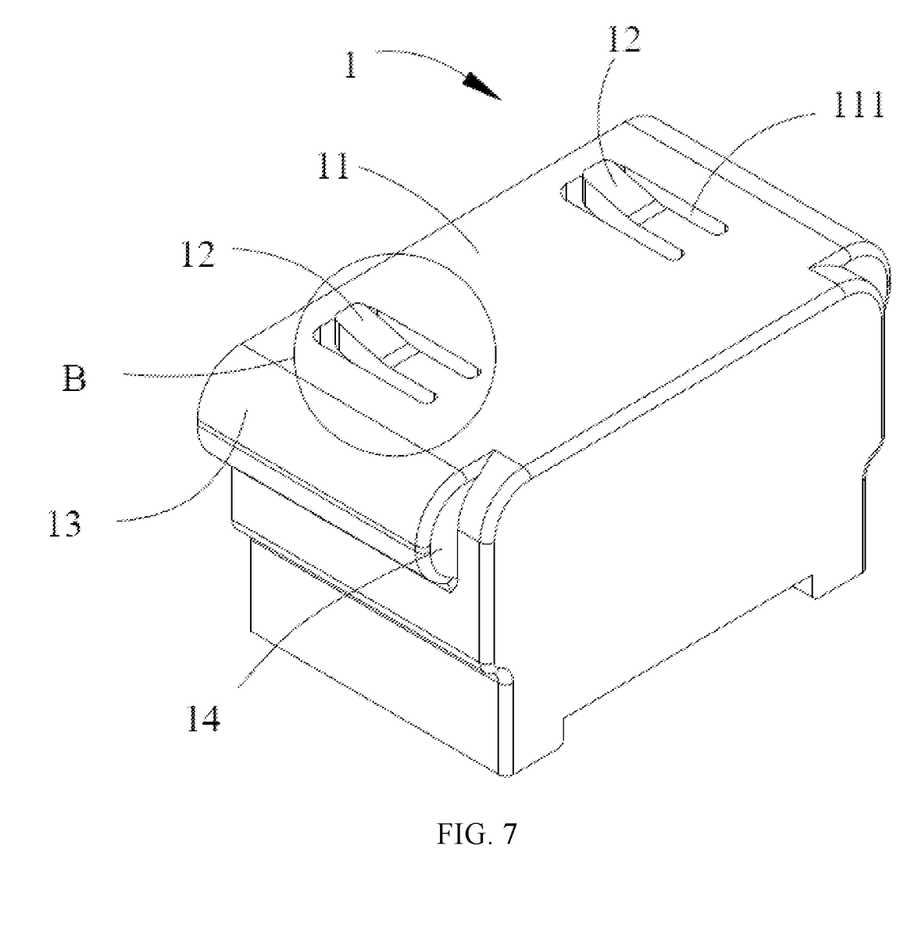
FIG. 7 is a schematic structural diagram of still another output electrode base in a battery module according to an embodiment of this application.
Figure 8:
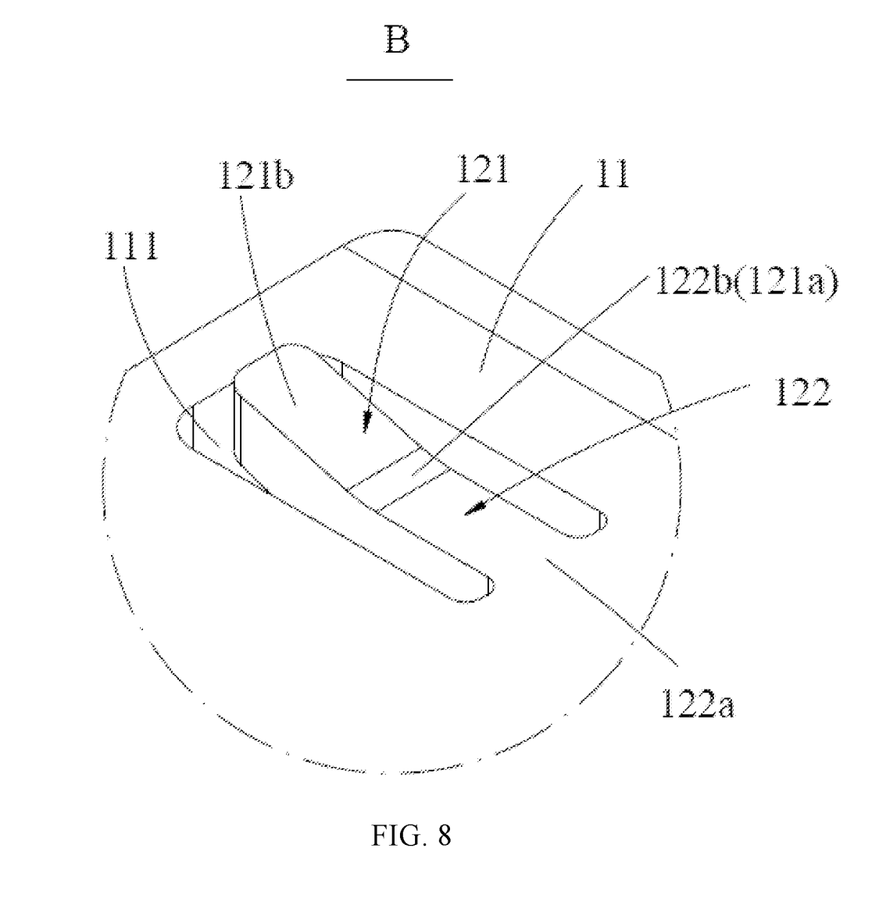
FIG. 8 is an enlarged view of position B in FIG. 7.

FIG. 7 is a schematic structural diagram of still another output electrode base in a battery module according to an embodiment of this application, and FIG. 8 is an enlarged view of position B in FIG. 7.

In a possible implementation, as shown in FIG. 7 and FIG. 8, a second limiting element 12 includes a fixed section 122 and an elastic section 121, a first end 122a of the fixed section 122 is connected to an inner wall of a through groove 111, a first end 121a of the elastic section 121 is connected to a second end 122b of the fixed section 122, and a second end 121b of the elastic section 121 protrudes from the base plate 11.

In a structure of the second limiting element 12, a flat and straight section is formed by the fixed section 122, and a raised tilt section is formed by the elastic section 121. During insertion of an insertion element 13 into a slot 23, a bevel of the raised tilt section can play a guiding role, so that the second limiting element 12 enters a stop hole 22. Disposition of the fixed section 122 can increase a length size of the entire second limiting element 12, thereby improving elastic performance of the second limiting element 12.

It can be understood that the fixed section 122 may be a sheet-like structure directly formed on the base plate 11, or the fixed section 122 may be a block-like structure. A notch may alternatively be provided in the block-like fixed section 122 to make the fixed section elastic to some extent. Alternatively, no notch may be provided in the block-like fixed section 122, and the second limiting element 12 enters the stop hole 22 with the help of elastic performance of the elastic section 121.

The following describes another example embodiment. However, detailed description of constituent components the same as those in the foregoing example embodiment is omitted, and only different constituent components are described in detail.

Figure 9:
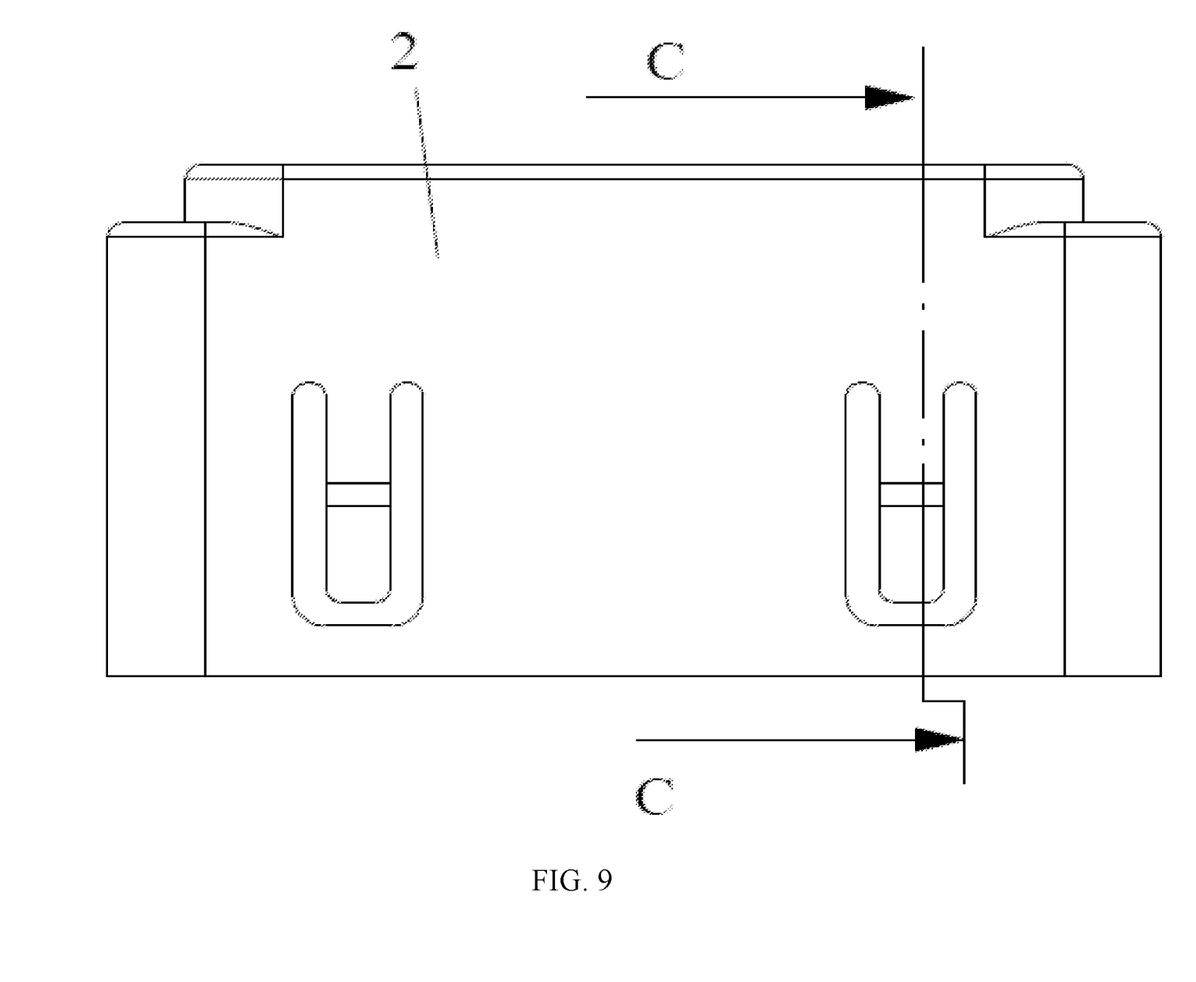
FIG. 9 is a main view of an output electrode base fitted to an end plate in a battery module according to an embodiment of this application.
Figure 10:
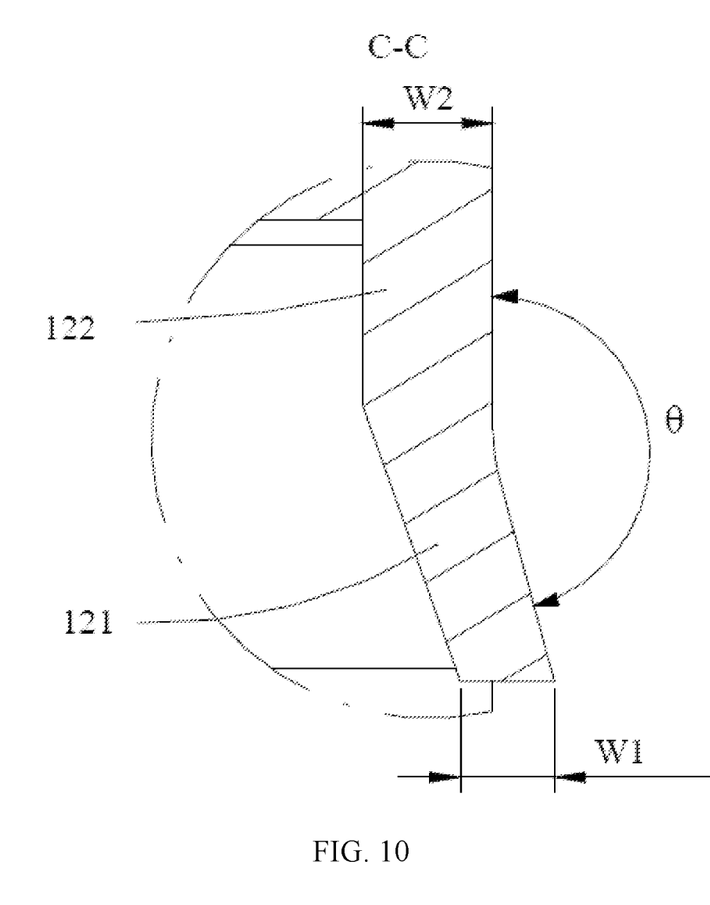
FIG. 10 is a cross-sectional view of FIG. 9 in a C-C direction.

FIG. 9 is a main view of an output electrode base fitted to an end plate in a battery module according to an embodiment of this application, and FIG. 10 is a cross-sectional view of FIG. 9 in a C-C direction.

In a possible implementation, as shown in FIG. 9 and FIG. 10, a thickness (W1) of an elastic section 121 is less than a thickness (W2) of a fixed section 122. In this way, the relatively thick fixed section 122a guarantees a connection strength of a second limiting element 12, and the relatively thin elastic section 121 improves elastic performance of the second limiting element 12.

It should be noted that both the thickness (W1) of the elastic section 121 and the thickness (W2) of the fixed section 122 are average thickness.

The second limiting element 12 may have a curve structure or a bevel structure. In the foregoing, the elastic section 121 can form a bevel structure. In a possible implementation, an angle 9 between the elastic section 121 and the fixed section 122 meets: $90°<\theta<180°$, to form the bevel structure of the elastic section 121. This can facilitate insertion and assembly of the output electrode base 1.

It should be noted that the angle θ between the elastic section 121 and the fixed section 122 is an angle between a side, protruding from the base plate 11, of the elastic section 121 (refer to FIG. 8) and a side, protruding from the base plate 11, of the fixed section 122.

Optionally, the angle θ between the elastic section 121 and the fixed section 122 meets: $135°<\theta<170°$. Such angle facilitates a guiding role of the bevel structure and does not damage the second limiting element 12.

Figure 11:
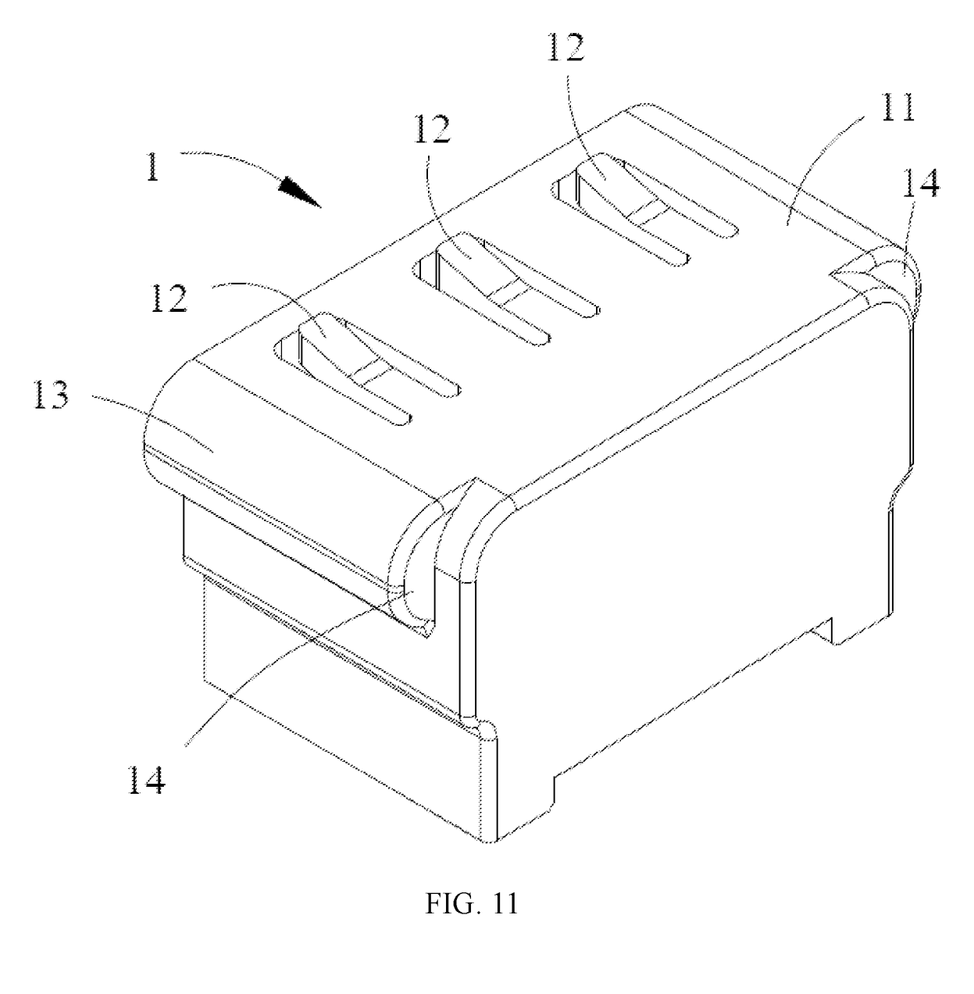
FIG. 11 is a schematic structural diagram of yet another output electrode base in a battery module according to an embodiment of this application.

In the battery module 100 provided in this embodiment of this application, there may be one (refer to FIG. 4) or two (refer to FIG. 5) second limiting elements 12. FIG. 11 is a schematic structural diagram of yet another output electrode base in an battery module according to an embodiment of this application. As shown in FIG. 11, there are three second limiting elements 12.

One, two, or three stop holes 22 may be provided, depending on a quantity of second limiting elements 12. Certainly, there may be more second limiting elements 12 and stop holes 22, which is not further limited herein.

In the embodiment shown in FIG. 2, there are two stop holes 22. Two hole walls 221 are both planar, and are coplanar in a width direction (Y) of the battery module 100. In this case, second ends 121b of the elastic sections 121 of the second limiting elements 12 that are fitted to the stop holes 22 may be in an aligned state, as shown in FIG. 7. In another embodiment, the hole walls 221 may alternatively be non-planar. In another embodiment, there are at least two stop holes 22, and two hole walls 221 are parallel but not coplanar.

In a possible implementation, as shown in FIG. 5, there are at least two second limiting elements 12. Along a second direction (X2), second ends 121b of elastic sections 121 of the at least two second limiting elements 12 are mutually staggered, and hole walls 221 of at least two stop holes 22 that are fitted to the second limiting elements 12 are not coplanar. Therefore, the second limiting element 12 is implemented in a plurality of manners, so as to adapt to different forms of end plates 2.

In some embodiments, an electric apparatus includes the aforementioned battery module. The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A battery module, comprising:
an output electrode base and an end plate, wherein the output electrode base is inserted into and fitted to the end plate, and wherein the output electrode base is a freestanding unitary structure having a width of the output electrode base is smaller than a width of the end plate, wherein the end plate comprises a body, and the output electrode base comprises a base plate, wherein a through groove is provided in the base plate, wherein the through groove includes an opening;
a first limiting element is disposed on and along a length of the output electrode base, the first limiting element being a projection fixed on a surface different from the base plate of the output electrode base; a limiting plate is disposed on the end plate; and the first limiting element is fitted to the limiting plate to limit relative movement of the output electrode base and the end plate along a first direction;

a stop hole is provided in the body of the end plate along a height direction of the battery module; and a second limiting element is disposed on the output electrode base; the second limiting element is accommodated in the stop hole; and the second limiting element is fitted to the stop hole to limit relative movement of the output electrode base and the end plate along a second direction and the second limiting element protrudes from the base plate along the height direction of the battery module, wherein the base plate is perpendicular to the height direction of the battery module, a first end of the second limiting element is connected to an inner wall of the through groove, there is a gap between the second limiting element and the inner wall of the through groove outside the first end, and the opening in the through groove is disposed away from the first end of the second limiting element; and an extension direction of the first direction is opposite to an extension direction of the second direction.

2. The battery module according to claim 1 wherein the second limiting element comprises an elastic section;
  a first end of the elastic section is connected to the inner wall of the through groove; and
  a second end of the elastic section protrudes from the base plate.

3. The battery module according to claim 2, wherein the second limiting element comprises a fixed section and the elastic section;
  a first end of the fixed section is connected to the inner wall of the through groove;
  the first end of the elastic section is connected to a second end of the fixed section; and
  the second end of the elastic section protrudes from the base plate.

4. The battery module according to claim 2, further comprising at least two second limiting elements, wherein second ends of elastic sections of the at least two second limiting elements are mutually staggered along the second direction; and hole walls, fitted to the second limiting elements, of at least two stop holes are not coplanar.

5. The battery module according to claim 1, wherein the second limiting element comprises a fixed section and an elastic section;
  a first end of the fixed section is connected to the inner wall of the through groove;
  the first end of the elastic section is connected to a second end of the fixed section; and
  the second end of the elastic section protrudes from the base plate.

6. The battery module according to claim 5, wherein a thickness of the elastic section is less than a thickness of the fixed section.

7. The battery module according to claim 6, further comprising at least two second limiting elements, wherein second ends of elastic sections of the at least two second limiting elements are mutually staggered along the second direction; and hole walls, fitted to the second limiting elements, of at least two stop holes are not coplanar.

8. The battery module according to claim 5, wherein an angle $\theta$ between the elastic section and the fixed section meets: $90°<\theta<180°$.

9. The battery module according to claim 8, wherein the angle $\theta$ between the elastic section and the fixed section meets: $135°<\theta<170°$.

10. The battery module according to claim 9, further comprising at least two second limiting elements, wherein second ends of elastic sections of the at least two second limiting elements are mutually staggered along the second direction; and hole walls, fitted to the second limiting elements, of at least two stop holes are not coplanar.

11. The battery module according to claim 8, further comprising at least two second limiting elements, wherein second ends of elastic sections of the at least two second limiting elements are mutually staggered along the second direction; and hole walls, fitted to the second limiting elements, of at least two stop holes are not coplanar.

12. The battery module according to claim 5, further comprising at least two second limiting elements, wherein second ends of elastic sections of the at least two second limiting elements are mutually staggered along the second direction; and hole walls, fitted to the second limiting elements, of at least two stop holes are not coplanar.

13. An electric apparatus, comprising a battery module according to claim 1.

* * * * *